May 5, 1936.  M. L. CATON  2,039,776
METHOD OF WEATHERPROOFING SHINGLES OR LIKE ARTICLES
Original Filed Dec. 12, 1929   8 Sheets-Sheet 1
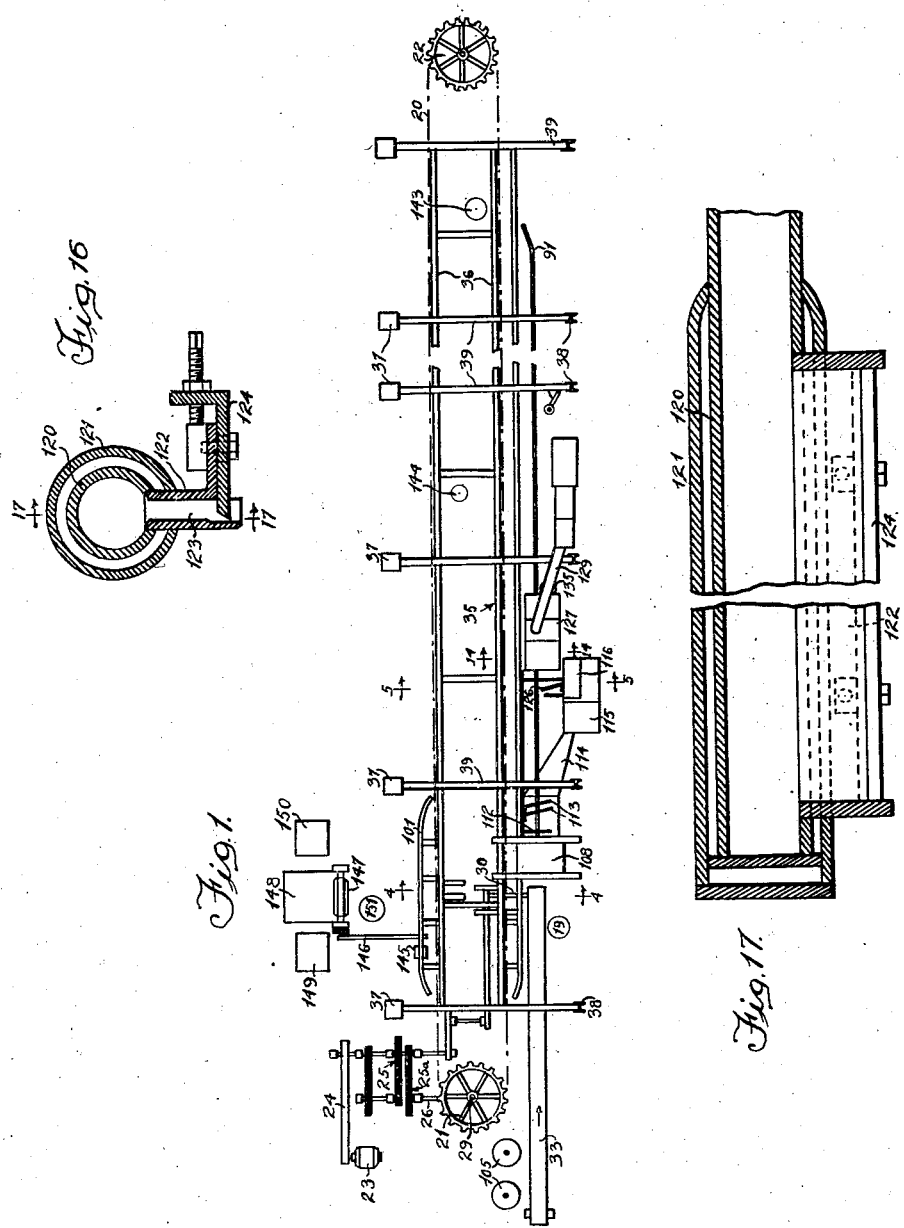
INVENTOR
Maurice L. Caton
BY
Samuel Stearman
ATTORNEY May 5, 1936.  M. L. CATON  2,039,776
METHOD OF WEATHERPROOFING SHINGLES OR LIKE ARTICLES
Original Filed Dec. 12, 1929  8 Sheets-Sheet 2
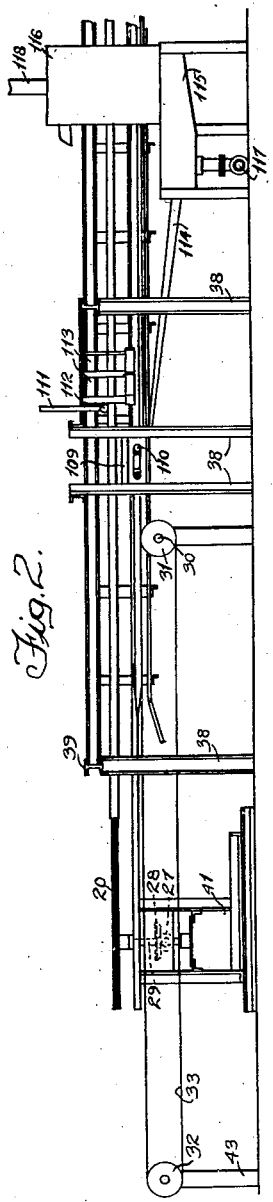
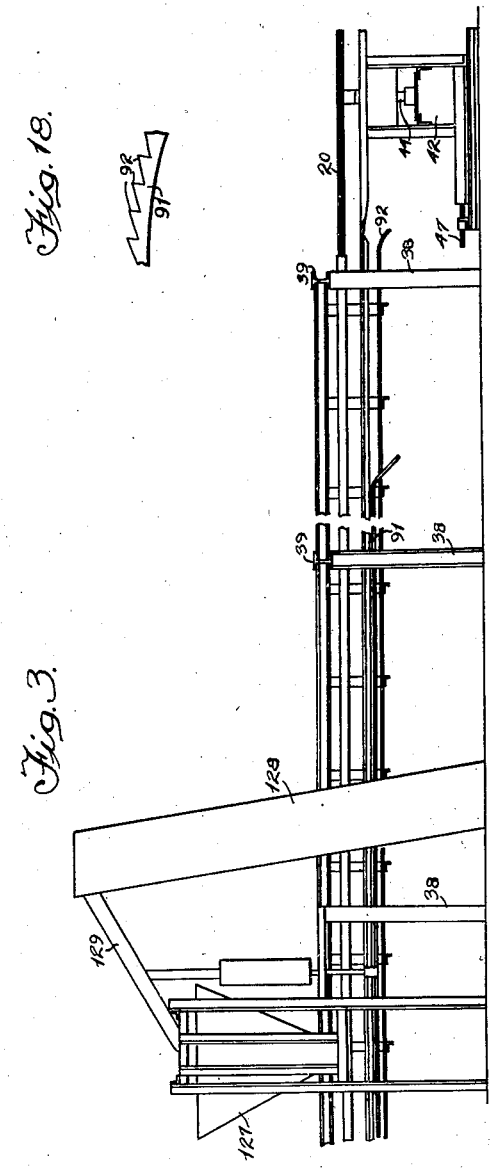
INVENTOR
Maurice L. Caton
BY
Samuel Stearman
ATTORNEY May 5, 1936.　　　　M. L. CATON　　　　2,039,776
METHOD OF WEATHERPROOFING SHINGLES OR LIKE ARTICLES
Original Filed Dec. 12, 1929　　8 Sheets-Sheet 3

INVENTOR
Maurice L. Caton
BY
ATTORNEY

May 5, 1936. M. L. CATON 2,039,776
METHOD OF WEATHERPROOFING SHINGLES OR LIKE ARTICLES
Original Filed Dec. 12, 1929 8 Sheets-Sheet 4

INVENTOR
Maurice L. Caton
BY
Samuel Stearman
ATTORNEY

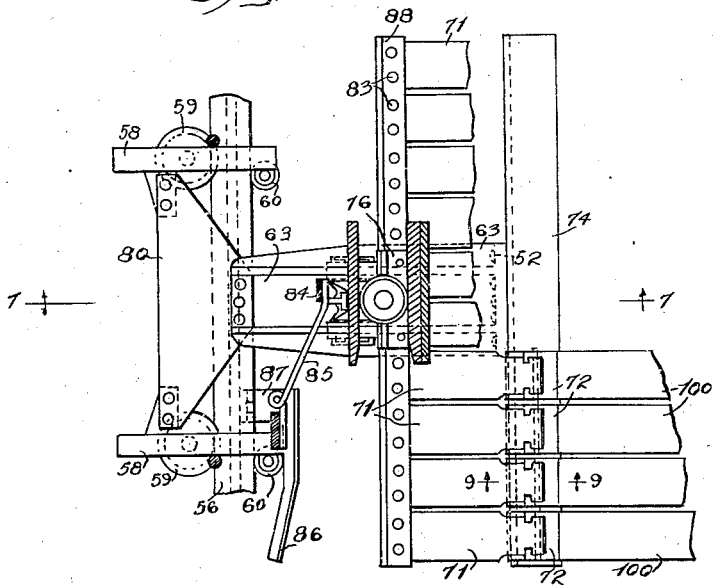
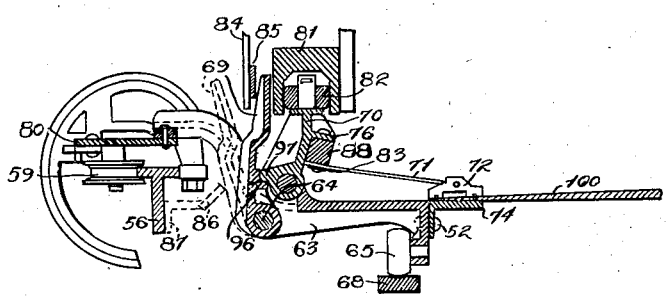

May 5, 1936.  M. L. CATON  2,039,776
METHOD OF WEATHERPROOFING SHINGLES OR LIKE ARTICLES
Original Filed Dec. 12, 1929  8 Sheets-Sheet 6

INVENTOR
Maurice L. Caton
BY
Samuel Stearman
ATTORNEY

May 5, 1936.  M. L. CATON  2,039,776

METHOD OF WEATHERPROOFING SHINGLES OR LIKE ARTICLES

Original Filed Dec. 12, 1929   8 Sheets-Sheet 7

INVENTOR
Maurice L. Caton
BY
Samuel Stearman
ATTORNEY

May 5, 1936. M. L. CATON 2,039,776
METHOD OF WEATHERPROOFING SHINGLES OR LIKE ARTICLES
Original Filed Dec. 12, 1929 8 Sheets-Sheet 8
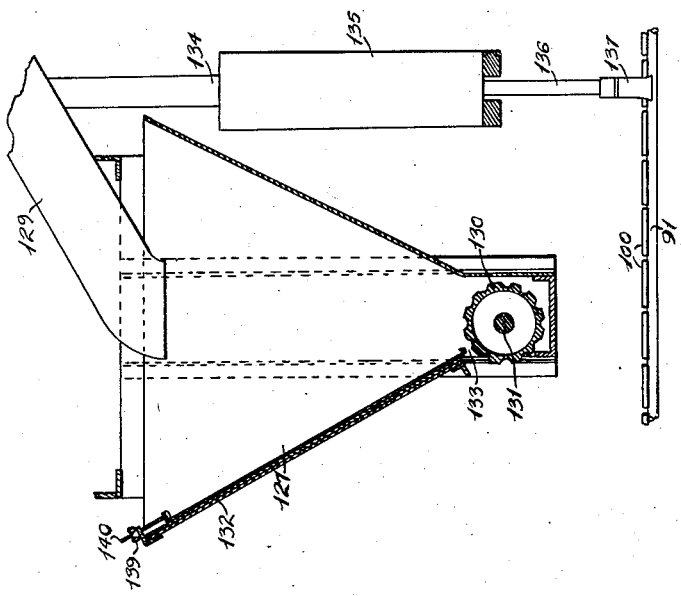
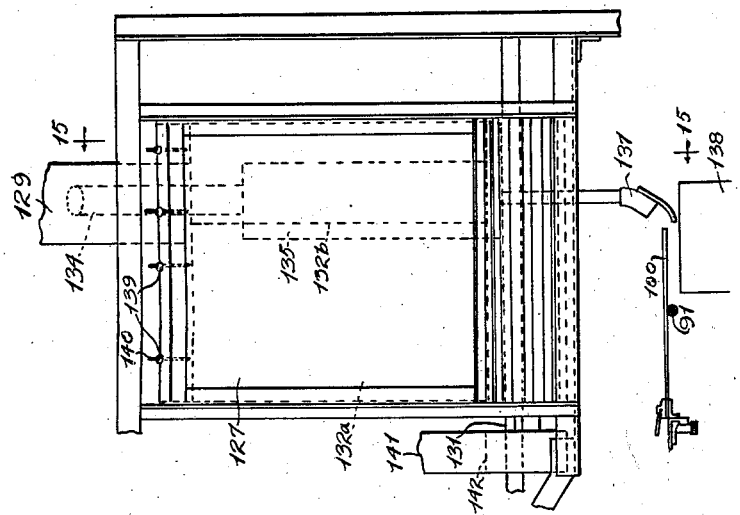
INVENTOR
Maurice L. Caton
BY
Samuel Stearman
ATTORNEY Patented May 5, 1936

2,039,776

UNITED STATES PATENT OFFICE 2,039,776

METHOD OF WEATHERPROOFING SHINGLES OR LIKE ARTICLES

Maurice L. Caton, White Plains, N. Y., assignor to The Patent and Licensing Corporation, New York, N. Y., a corporation of Massachusetts Original application December 12, 1929, Serial No. 413,668. Divided and this application November 23, 1933, Serial No. 699,342

6 Claims. (Cl. 91—68)

The invention relates to the treating of shingles, and more particularly it relates to improved methods of weather-proofing shingles, or like articles, the present application being a division of my prior application Serial No. 413,668 filed December 12, 1929.

The invention contemplates the feeding of untreated shingles into one end of the machine, the shingles being carried by the machine at a constant rate of speed and discharged from the machine completely weather-proofed as a result of being subjected to a plurality of processes applied both manually and automatically while the shingles are traveling through the machine.

In the weather-proofing of shingles as heretofore practiced, it has been found necessary for the operator or operators to handle the shingles at certain stages of the treatment and upon completion of the treatment to place the shingles in a drying rack, where they must remain for a considerable time before being arranged in bundles, the drying process being necessary to prevent the individual shingles from sticking together when arranged in bales.

An object of the invention is to provide an improved method of weather-proofing shingles or similar articles in which there is no intermediate manual manipulation of the shingles.

Another object is the provision of a shingle treating machine operable to practice a method whereby individual shingles are fed into the machine and subjected to a treatment comprising a plurality of steps, upon completion of which, the shingles are discharged from the machine in condition to be immediately assembled and baled.

A still further object of the invention is the provision of a method in which the desired steps of weather-proofing shingles are simplified, and upon the completion of the treatment the surfaces of the shingles are sufficiently non-cohesive to permit the shingles to be arranged in bales under pressure without sticking together.

In the drawings, wherein like reference characters indicate like or corresponding parts, Fig. 1 is a general plan view of an improved machine showing diagrammatically the devices of my invention, the machine being suitable for practicing my improved method of treating shingles;

Figs. 2 and 3 together show a side elevational view on a larger scale of the machine;

Fig. 6 is a sectional view, drawn to a larger scale, along the line 6—6 of Fig. 4;

Fig. 7 is a sectional view along the line 7—7 of Fig. 6;

Fig. 14 is a view along the line 14—14 of Fig. 1, drawn to a larger scale;

Fig. 15 is a sectional view along the line 15—15 of Fig 14;

Fig. 16 is a sectional view along the line 16—16 of Fig. 5;

Fig. 17 is a sectional view along the line 17—17 of Fig. 16; and

Fig. 18 is a detail view of a portion of the supporting rail.

Figure 4:
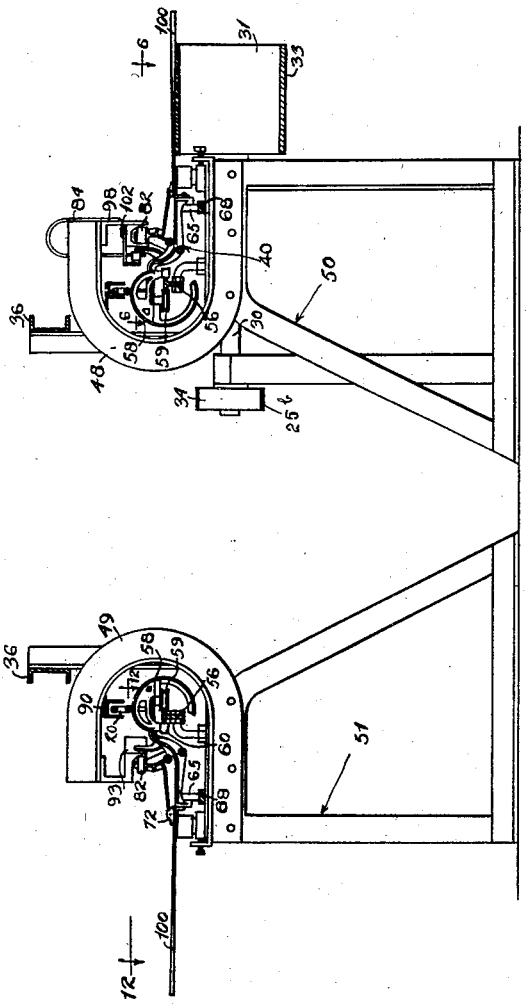
Fig. 4 is a sectional view drawn to a larger scale, along the line 4—4 of Fig. 1.

Referring now more particularly to the drawings, the numeral 20 designates an endless chain conveyor traveling in a horizontal plane. The conveyor 20 extends the full length of the machine and is carried by a driven sprocket wheel 21 positioned at one end and an idler sprocket wheel 22 at the other end of the machine.

The chain conveyor 20 is operatively connected with a motor 23 by means of a pulley 24 and a power transmission system 25. The power transmission system designated generally by the numeral 25 is shown diagrammatically as comprising a plurality of operatively connected shafts, pulleys and belts arranged to step down the speed of the motor 23. No designating numerals are applied to the individual shafts, pulleys and belts comprising the system 25, inasmuch as the system, as shown, is merely a diagrammatical representation of any suitable step down power transmission system, and applicant is not claiming invention in the transmission system, as such.

The transmission system 25 transmits motion to another transmission system designated generally by the numeral 25a, which in turn actuates a shaft 26 and a belt 25b which travels around a pulley 34 (Fig. 4) mounted on one end of a shaft 30. The shaft 26 actuates, by means of bevel gears 27 and 28, and a vertical shaft 29, on which the driven sprocket wheel 21 is mounted. The shaft 30 rotates a pulley 31 operable to actuate a carrier belt 33.

A frame-work 35, comprising a plurality of vertical members 37 and 38, longitudinally extending members 36, and transversely extending members 39 provides a support for a back and for various other members comprising the machine. The vertical members 37 are shown in Fig. 1 as also serving as building posts or supports. It is obvious that the device may be assembled independently of such posts and that the construction of the frame-work 35 may be varied to suit the particular installation.

The carrier belt 33 and the chain conveyor 20 are kept continually moving when the machine is in operation. The chain conveyor 20 actuates a plurality of closely positioned carriages designated generally by the numeral 40, extending entirely around the conveyor 20 on a T rail 56. Each of the carriages 40 is preferably of a capacity to receive a plurality of shingles 100.

The shingles to be treated are placed upon turn tables 105 within reach of an operator who stands on the other side of the belt 33 and places individual shingles on the belt so as to be advanced edgewise. At one end the belt 33 engages an idler pulley 32 carried in a member 43. The other end of the belt marks the location of a loading station hereinafter designated by the numeral 19, where a second operator is positioned to manually feed the advancing shingles from the belt 33 into the carriages 40 as they move by in horizontal position. The thin end of the shingles is fed into and clamped by the carriages 40 with the shingles projecting laterally from the carriages. The shingles are thereby conveyed edgewise from the loading station 19 by the carriages in a substantially horizontal plane for approximately the full length of the machine. Before the carriages 40 arrive at the idler sprocket wheel 22 they are caused to rotate from horizontal to a vertical position. The carriages 40, and the shingle 100 clamped therein retain this vertical position as the chain conveyor 20 moves around the idler sprocket 22 and back on the opposite side of the machine until they approach an unloading station 151 positioned substantially opposite the loading station 19. The carriages 40 are rotated so as to bring the shingles 100 into substantially horizontal position before arriving at the unloading station 151 (Fig. 1). The carriages 40 are again caused to swing down into vertical position upon leaving the unloading station and retain this position while passing the driving sprocket wheel 21. As the empty carriages 40 again approach the loading station 19 they are caused to swing upwardly into horizontal position in a manner hereinafter more particularly described.

The shingles 100, in traveling from the loading station 19 to the unloading station 151 are each subjected to a plurality of processes which completely weather-proof the shingles and form nonadhesive surfaces, permitting the freshly treated shingles to be immediately baled. The upper face and the butt end of the shingles are treated while in horizontal position. The under face of each shingle is treated while the shingles are being advanced in vertical position.

The driving sprocket wheel 21 is carried by an end pedestal and track support constructed of a plurality of structural members, generally designated by the numeral 41. The idler sprocket wheel 22, positioned at the other end of the machine, is carried by a pedestal 42, similar in construction to the pedestal 41. The pedestal 42 is provided with a thrust screw 47 to regulate the tension in the chain conveyor 20.

Figure 12:
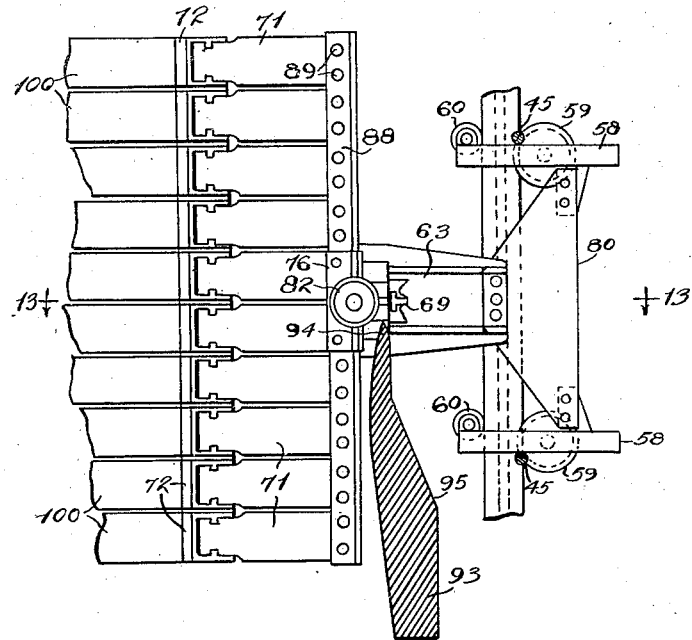
Fig. 12 is a view along the line 12—12 of Fig. 4.
Figure 13:
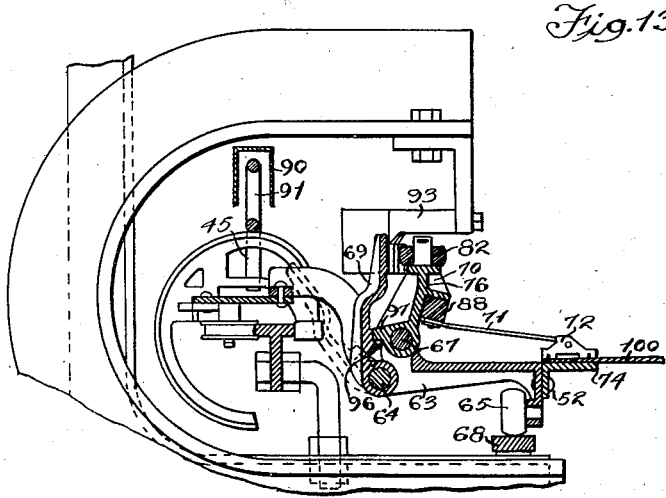
Fig. 13 is a sectional view along the line 13—13 of Fig. 12.

The carriages 40 move on a track positioned underneath the chain conveyor 20, the track preferably being positioned at approximately three feet from the floor. The chain conveyor 20 comprises a plurality of links 91, from which fingers 45 are suspended at predetermined spacings. The fingers 45 are arranged in pairs, each pair operatively engaging a carriage 40, as best shown in Figs. 6, 12 and 13.

Figure 5:
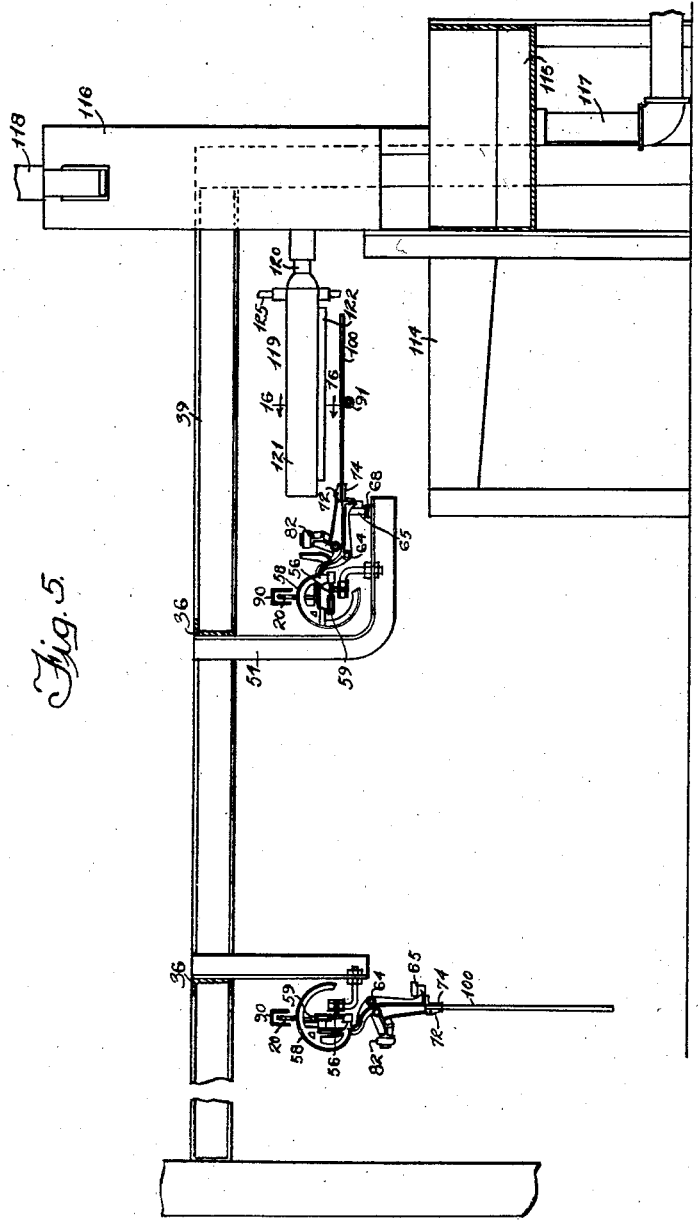
Fig. 5 is a sectional view, drawn to a larger scale, along the line 5—5 of Fig. 1.

The track, on which the carriages 40 travel, is preferably constructed of sections of a T rail 56. The T rail 56 has its stem vertical for that portion of the track where the carriages 40 are in position to carry the shingles horizontally, as shown in Figs. 4, 5, 7, 8, and 13. The T 56 has its stem horizontal for that portion of the track where the carriages 40 are suspended from the conveyor 20 in vertical position, as shown in Fig. 5. Between these vertical and horizontal positions the T rails 56 are twisted through an angle of 90 degrees, thereby providing a warped track on which the carriages 40 move from the horizontal to vertical positions and vice versa.

Figure 8:
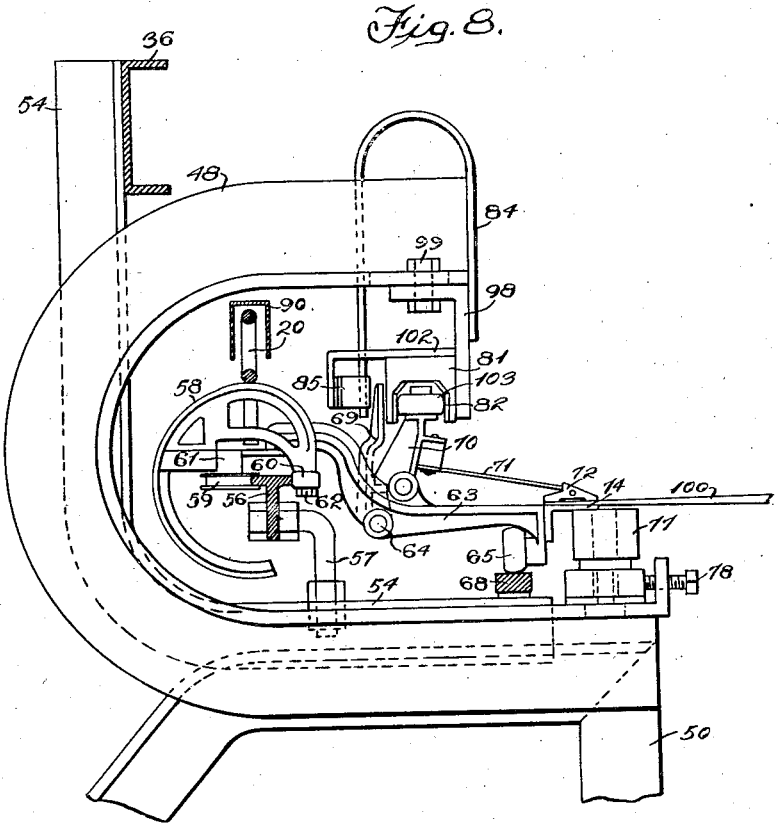
Fig. 8 is a fragmentary sectional view, drawn to a larger scale, of a portion of the device shown in Fig. 4.
Figure 9:
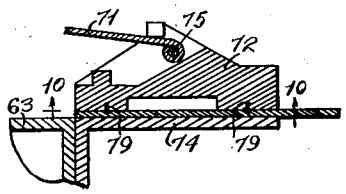
Fig. 9 is a large scale fragmentary sectional view along the line 9—9 of Fig. 6.
Figure 10:
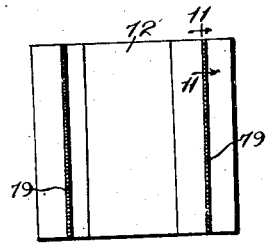
Fig. 10 is a view along the line 10—10 of Fig. 9.
Figure 11:
Fig. 11 is a view along the line 11—11 of Fig. 10.

The T rail 56 extends around the machine in a substantially horizontal plane and is carried by a plurality of L-shaped angle iron supports 54 and angle iron hangers 55. The sections of the T rail 56 are connected to the supports 54 and hangers 55 by a plurality of L shaped bolts, as is best shown in Figs. 4, 5, and 8. The supports 54 and hangers 55 are connected to the longitudinal members 36 by any desired means, the weight of the track and the load carried thereby being thus transmitted to the frame-work support 35, of which the members 36 form a part.

The carriage 40 comprises a pair of frames 58 on each of which is mounted a trolley wheel 59, so positioned as to engage one flange of the T rail 56. Guard rollers 60 are mounted on the frames 58 opposite to the trolley wheel 59 in position to engage the flange of the T rail 56. The trolley wheel 59 is rotatably mounted on a knuckle joint 61 and the guard rollers 60 are similarly mounted on stud bolts 62, as best shown in Fig. 8. It is to be noted that the fingers 45, projecting downwardly from the chain conveyor 20, engage the outer edges of the frames 58. The frames 58 each have a riveted connection with a tie plate 80. A transversely extending main frame 63 is similarly riveted to the mid portion of the plate 80 in such a way as to be substantially horizontal when the stem of the T rail 56 is vertical. The frame 63 acts as a vertical hanger from which the main portion of the carriage 40 is suspended when the stem of the T rail 56 is horizontal. The outer projecting end of the frame 63 carries an underlying roller 65, which travels on a rectangular rail 68 when the frame 63 is horizontal. The rail 68 is provided only for that portion of the track wherein the carriage 40 is advanced in horizontal position. The rails 56 and 68 are positioned at some distance apart and thereby provide a rigid track for the carriage 40 as it travels in its horizontal loaded position. A thrust roller 77 is mounted on the pedestal 50 in a position to assist in carrying the weight of the finger 72 and the shingles 100. An adjustment screw 78 is provided for varying the distance of the roller 77 from the T rail 56.

The clamping base 74 is fastened to the outer extremity of the frame 63 by a plurality of rivets 52. A plurality of grip fingers 72 are positioned in end to end relation immediately above the clamping base 74. Each of the carriages 40 is shown as having ten of the fingers 72, but any other desired number may be used. The fingers 72 are not attached to the clamping base 74, but each has a pivoted connection 75 with a spring bar 71. The other end of the spring bars 71 is so connected with the main frame 63 as to permit the fingers 72 to move into and out of clamping relation with the base 74. For this purpose a member 70 is provided having a pivotal connection 67 with the frame 63. The member 70 has a projecting lip 76, on the under side of which is mounted a spring bar supporting member 88 extending the full length of the carriage 40. The spring bars 71 are fastened to the under side of the member 88 by a plurality of rivets or bolts 83. Rotation of the member 70 about its pivot 67 will similarly rotate, or tend to rotate, the spring bars 71 and the fingers 72 pivotally mounted on the other end thereof. A trip finger 69 is also pivotally mounted on the main frame 63 by a pin 64. The trip finger 69 is normally locked in engagement with the member 70 by means of cooperating projections 96 and 97 formed on the finger 69 and the member 70, respectively. The contact faces of the projections 96 and 97 are slightly inclined, as best shown in Figs. 7 and 13, so that the projection 97 normally holds the finger 69 in locking engagement with the projection 96 in member 70. As the carriages 40 swing from horizontal position to vertical position and vice versa, in traveling from the loading station to the unloading station, the fingers 69 are held in the full line position relative to the members 70, as shown in Figs. 5 and 13. In this position of the member 70 the fingers 72 are in clamping relation to the base 74 so that shingles positioned between the fingers and the base are firmly clamped therebetween.

As the carriages 40 approach the unloading station they are rotated from vertical to horizontal position by reason of the trolley wheel 59 and guard rollers 60 following the twisted portion of the T rail 56, as already described. The carriages 40 having moved into horizontal position adjacent the unloading station 151 are brought into operative engagement with a stationary cam 93 as best shown in Fig. 12. The cam 93 separates the finger 69 and the member 70 sufficiently to release the finger from engagement with the member and to permit the finger to take the dotted line position shown in Fig. 13. The stationary cam 93 has a vertical cam face 94 which wedges between the roller 82, mounted on the upper end of the member 70, and the upper end of the finger 69. The cam face 94 engages the roller 82, and the opposite face 95 of the cam 93 has a substantial inclination operating to disengage the finger 69 from the member 70. As the carriage 40 moves past the cam member 93 the member 70 is permitted to tilt slightly towards the T rail 56 and thereby release the fingers 72 from clamping engagement with the thin edge of the shingles 100. In order that shingles may be held firmly in position between the fingers 72 and the base 74, each of the fingers is provided with a pair of plates 79. The plates 79 are mounted on the under face of the fingers 72, and have their projecting edges serrated. The serrated edges of the plates 79 permit the fingers 72 to take a firm grip on the shingles when the trip finger 69 is in operative engagement with the member 70. As the fingers 72 are released by the throw of the trip finger 69 to its dotted line position, following movement of the carriage 40 past the stationary cam member 93, the shingles are easily removed from the carriage, such release occurring adjacent the unloading station 151. The empty carriages 40 leave the unloading station 151 and rotate to vertical position before passing the driving sprocket wheel 21 and are then rotated back to horizontal position as they approach the loading station 19. The trip finger 69, meantime, stays in its dotted line position of Fig. 13, thereby leaving the fingers 72 in spaced apart relation to the base 74.

The operator at the loading station 19 feeds shingles from the carrier belt 33 between the fingers 72 and the base 74. Immediately after the feeding of the shingles into the carriage 40 at the loading station 19, the trip finger 69 is again brought into operative engagement with the member 70, thereby clamping the shingles in place between the fingers 72 and the base 74.

The operative engagement of the trip finger 69 with the member 70 is accomplished by providing a cam support 87, mounted on the stem of the T rail 56 adjacent the loading station. A cam plate 86 is fastened on the support 87 in any suitable manner, as best shown in Figs. 6 and 7. The cam plate 86 is positioned in the path of the inclined finger 69 and moves the finger to the dotted line position shown in Fig. 7. Oppositely positioned pedestals 50 and 51 are provided adjacent the loading station and unloading station, respectively, as best shown in Fig. 4. The pedestals 50 and 51 have angle iron supporting members 48 and 49, respectively, fastened to the top thereof. The supporting members 48 and 49 are both turned back upon themselves in the form of a horizontally extending U. The upper leg of the member 48 provides a mounting for a hinged cam 85, so positioned as to elevate the advancing trip finger 69 from the dotted line position of Fig. 7 to the full line position of Fig. 6 as the carriage 40 advances.

An angle iron 98 is fastened to the member 48 by means of bolts 99. A spring steel clip 84 has one end fastened in any suitable manner upon the angle iron 98, the other end projecting downwardly into contact with the free end of the hinged cam 85. A guide 81 is also mounted upon the angle iron 98. A bar 102, fastened on the top of the guide 81, provides a mounting means for the hinged cam 85. The finger 69 passes between the hinge cam 85 and the edge of the guide member 81 as it is moved to locking engagement with the member 70. The lower portion of the guide member 81 is provided with a recess 103 having tapered side walls between which the guide roller 82 moves as the carriage 40 advances. The relative inclination and positions of the hinged cam 85 and the guide 81 are such as to bring the cooperating projections 96 and 97 into engagement as the finger 69 is moved into its vertical position.

The cams 86 and 85 cooperate to move the finger 69 into locking engagement with the member 70 immediately after the carriage has passed the unloading station. This locking is so timed as to clamp the new load of shingles, which have been inserted in the carriage 40, between the fingers 72 and base 74.

The shingles 100, as they advance in horizontal, edge-wise position, rest upon a pipe 91, so positioned that the shingle is substantially balanced, thereby relieving the thin edge of the shingle from the strains that would otherwise exist adjacent the fingers 72 and the base 74. The pipe 91 is preferably connected with a source of steam supply, not shown, so that the portion of the shingle in contact with the pipe will not be cooled, as would be the case were the pipe support not heated.

The carriage 40, having been loaded with shingles and the shingles clamped in position as it passes the loading station, continues to move in a horizontal position, carrying the shingles in edgewise relation through an oven 108. The oven 108 is provided with a fire brick cover 109, beneath which are positioned a plurality of gas burners 110. The width of the oven 108 and the speed of the conveyor 20 are such that preferably three seconds are required for the passage of a shingle therethrough. The shingle is thereby dried and its pores opened in preparation for a priming coat of asphalt which is applied to the shingles immediately upon leaving the oven 108. The asphalt is preferably 240 degrees melt point and is heated to approximately 360 degrees. In practice it is found desirable to heat the shingles before the application of the priming asphalt coat, as the asphalt when applied to a cold shingle does not penetrate the fibers. The priming coat of asphalt is delivered in the form of a spray through a horizontal pipe 112 having a plurality of small apertures in the under face thereof. A feed pipe 111 conveys the hot asphalt from a tank, not shown, to the horizontal pipe 112. The priming coat of asphalt, applied at the temperature of 360 degrees to the upper face of the heated shingle tends to form a blistered surface on the shingles by reason of the air bubbles coming out of the fibers. A pair of scrapers 113 is provided just ahead of the pipe 112 to remove all of the excess priming coat and thereby leaves the shingles impregnated with the asphalt and a thin layer on the surface which provides a bond for the final coat of asphalt.

The asphalt thus removed by the scrapers 113 falls into a sheet metal trough 114 and flows into a drain tank 115. A drain pipe 117 is provided to carry away the asphalt from the tank 115. A tank 116 supplies the heated material for the final coat of asphalt. The tank 116 is connected with a source of asphalt supplied by an inlet pipe 118. The hot asphalt from the tank 116 is delivered upon the upper face of the shingles 100 in the form of a ribbon spray. A discharge pipe 120 forms a conduit leading from the tank 116 terminating a short distance in front of the scrapers 113. The end of the pipe 120 extends transversely of the machine so that the machine is parallel with the advancing shingles. A steam jacket 121 surrounds the end of the pipe 120, as best shown in Figs. 16 and 17. A steam pipe 125 connects the jacket 121 with a steam supply. The steam jacket 121 is provided in order to keep the asphalt at the desired temperature, as it is discharged upon the upper face of the advancing shingles in the form of a ribbon upon the shingles passing underneath. An elongated outlet member 122, having spaced apart walls, forms an opening 123. The discharge of the hot asphalt through the opening 123 is controlled by an adjustable closure member 124.

A scraper 126 is provided to spread the final coat of asphalt evenly over the butt ends and the upper surfaces of the shingles, the surplus asphalt meanwhile dropping into the drain tank 115.

The advancing carriage 40 next moves the shingles underneath a hopper 127, from which finely divided particles of slate are discharged onto the shingles. An elevator 128 is provided to convey the slate from a source of supply into a down spout 129 which discharges into the hopper 127. The elevator 128 is shown diagrammatically and is preferably of the bucket type, although any other suitable means for keeping a supply of slate in the hopper may be utilized. The slate is discharged from the hopper 127, through an opening 133, by the rotation of fluted drum 130. The drum 130 is rotated by a shaft 131 through a pulley 142 and a belt 141 having a connection with a source of power not shown. The side 132 of the hopper 127 is foreshortened at the bottom in order to provide an opening 133 between the side and the drum 130. The size of the opening 133 is varied by means of adjustable closure members 132a and 132b, in order to regulate the amount of slate discharged upon the upper surface of the shingles. A plurality of rods 140, equipped with thumb nuts 139 provide means for adjusting the closure members 132a and 132b. For the ordinary length of shingle, as shown in Fig. 14, the member 132b may be kept entirely closed. In the event longer shingles or other articles are being treated, the member 132b may also be opened in order that the upper surface of the article may have a sprinkling of slate particles deposited thereon throughout its entire length. A supplementary hopper 135 is connected with the down spout 129 by a spout 134. Some of the slate particles traveling down the spout 129 enter the hopper 135 through the spout 134 and are discharged onto a table or platform 138 through a small discharge spout 136. A nozzle 137 on the end of the pipe 136 discharges onto the top of the table 138. The nozzle 137 is positioned sufficiently close to the top of the table 138 that a pile of ground slate is collected on the table and normally closes the nozzle 137. The nozzle 137 is so positioned that the butt ends of the advancing shingles move through the pile of slate particles and receive a coating similar to the coating sprinkled on the upper surface of the shingle.

The pipe support 91 terminates a short distance beyond the slate sprinkling station at the point where the advancing shingles and the carriages 40 drop from a horizontal to vertical position. The end of the pipe 91 curves downwardly opposite the twisted portion of the T rail 56, the curved portion of the pipe being provided with a plurality of step like projections 92 with which the butt ends of the descending shingles contact in turn as they advance. As the shingles drop from one step projection 92 to the next adjacent projection, the impact serves to discharge the loose slate particles on the floor at the end of the pipe 91.

The treated face of the shingles is on the outside of the carriage 40 when suspended in vertical position from the T rail 56.

The inner faces of the advancing shingles are either coated with asphalt, heated to substantially the same temperature as the priming and the final coat of asphalt applied to the upper surface and to the butt end of the shingles, or they may be coated with an emulsified asphalt composition applied at normal temperature. The carriage 40 then moves the shingles in vertical position around the idler sprocket wheel 22 and back towards the unloading station. Before the shingles reach the unloading platform their inner faces are surfaced with mica.

As the carriages 40 approach the unloading station, they are again rotated into horizontal position by the twisted T rail 56.

The shingles 100 carried by the carriage 40 are brought into contact with a guide rail 101 which extends the full length of the unloading station. The end of the guide rail 101 curves downwardly so that the advancing vertical shingles first contact with the outer edge of the curved portion of the rail 101. The curvature and position of the rail 101 is such as to assist in supporting the advancing shingles as they rotate from vertical into horizontal position. When the carriages reach their horizontal position, the clamping fingers 72 are released from the shingles, thereby permitting an operative stationed at the unloading station to remove the shingles. The operative feeds the treated shingles through a set of pressure rollers 147, from which the shingles are discharged onto a platform 148. The rollers 147 are actuated by a motor 145 through the medium of a belt drive 146, shown diagrammatically in Fig. 1. The rollers 147 firmly imbed the slate particles in the coating of asphalt on the upper surface and butt ends of the shingles and imbed the mica in the emulsified coating composition on the under surface of the shingles. This rolling operation provides the shingles with a non-adhesive surface. Operators, positioned one on either side of the platform 148 remove the shingles from the platform and place them on adjoining tables 149 and 150 in piles suitable for baling. By the use of 240 degrees melt point asphalt and the subsequent treatment of the surface with the powdered slate and mica followed by the rolling process, the surfaces of the shingles are sufficiently non-adhesive as to enable the shingles to be immediately put up in bales without the shingles sticking together. The processes for weather-proofing shingles heretofore adopted have been objectionable for the reason that the shingles must be placed in a drying rack after the treatment, because if immediately baled they will stick together. Thus it will be seen that I have provided an improved method for weatherproofing shingles and an improved machine for practicing such method, whereby the capacity production of shingles per man has been greatly increased and the shingles thus treated are in a condition to be immediately baled without any objectionable adhesion.

Having thus described my invention, it is obvious that various immaterial modifications may be made in the same without departing from the spirit of my invention; hence, I do not wish to be understood as limiting myself to the exact form, construction, arrangement and combination of parts herein described and shown, or uses mentioned.

What I claim as new and desire to secure by Letters Patent is:

1. The method of treating shingles which includes conveying said shingles flatwise in a substantially horizontal plane and applying a treating liquid to one face and to the butt end, of said shingles, then rotating said advancing shingles into a vertical plane and applying a treating liquid to the other face of said shingles while the shingles are in the vertical plane.

2. The method of treating shingles which includes conveying said shingles flatwise in a substantially horizontal plane and applying a treating liquid to the upper face and butt end only, of said shingles, then rotating said advancing shingles into a vertical plane and applying a treating liquid to the under face of said shingles while the shingles are in the vertical plane.

3. The method of treating shingles which includes heating and conveying said shingles flatwise in a substantially horizontal plane and applying a treating liquid to the upper face and to the butt end of said shingles, then rotating said advancing shingles into a vertical plane and applying a treating liquid to the under face of said shingles while the shingles are in the vertical plane.

4. The method of treating shingles which includes conveying said shingles flatwise in a substantially horizontal plane, heating the advancing shingles, then applying a treating liquid and powdered slate to one face and the butt end of said shingles, then rotating the moving shingles into a vertical plane, and applying a treating liquid and mica to the other face of the shingles while the shingles are in the vertical plane.

5. The method of treating shingles which includes conveying said shingles flatwise in a substantially horizontal plane, heating the advancing shingles, then applying a treating liquid and powdered slate to the upper face and to the butt end of said shingles, while moving in said horizontal position, then rotating the moving shingles into a vertical plane, and applying a treating liquid and mica to the other face of the shingles while the shingles are in the vertical plane.

6. The method of treating shingles which includes heating the shingles, and conveying the shingles flatwise in a substantially horizontal plane beneath a spray of treating liquid, then scraping the upper surface of the shingles, then moving the shingles in order through a second spray of heating liquid and a spray of powdered material, then moving the shingles into a vertical plane and applying a treating liquid and mica to the untreated surface of the shingles while the shingles are in the vertical plane and then subjecting the shingles to pressure.

MAURICE L. CATON.